(12) United States Patent
Hammond

(10) Patent No.: US 6,665,977 B2
(45) Date of Patent: Dec. 23, 2003

(54) SPINNERBAIT FISHING LURE

(75) Inventor: John B. Hammond, 520 McGarity Dr., McDonough, GA (US) 30252

(73) Assignee: John B. Hammond, McDonough, GA (US)

( * ) Notice: Subject to any disclaimer, the term of this patent is extended or adjusted under 35 U.S.C. 154(b) by 0 days.

(21) Appl. No.: 10/002,056

(22) Filed: Nov. 30, 2001

(65) Prior Publication Data

US 2003/0101637 A1 Jun. 5, 2003

(51) Int. Cl.7 .............................................. A01K 85/10
(52) U.S. Cl. ...................................................... 43/42.18
(58) Field of Search ............................ 43/42.18, 42.11, 43/42.13, 42.14

(56) References Cited

U.S. PATENT DOCUMENTS

| | | | |
|---|---|---|---|
| 1,701,528 A | 2/1929 | Clewell | |
| 1,832,037 A | 11/1931 | Meehan | |
| 2,027,069 A | 1/1936 | Sorenson | 43/46 |
| 2,167,334 A | 7/1939 | Hayes | 43/42 |
| 2,261,549 A | 11/1941 | Hayes | 43/40 |
| 2,316,048 A | 4/1943 | Clarke | 43/42 |
| 2,722,766 A | 11/1955 | Accetta | 43/42 |
| 2,785,497 A | 3/1957 | Berry | 43/42.26 |
| 3,110,979 A | 11/1963 | Woodley | 43/42.74 |
| 3,344,550 A | 10/1967 | Peters | 43/42.14 |
| 3,429,066 A | 2/1969 | McClellan | 43/42.24 |
| 3,440,757 A | 4/1969 | McClellan | 43/42.24 |
| 3,537,207 A | 11/1970 | McClellan et al. | 43/42.24 |
| 3,965,606 A | 6/1976 | Bingler | 43/42.16 |
| 4,133,134 A | 1/1979 | Cheng | 43/42.06 |
| 4,138,792 A | 2/1979 | Hill | 43/42.24 |
| 4,211,027 A | 7/1980 | Viscardi | 43/42.24 |
| 4,571,877 A | * 2/1986 | Montgomery | 43/42.11 |
| 4,815,233 A | * 3/1989 | Pingel | 43/42.11 |
| 5,113,615 A | 5/1992 | Drachkovitch | 43/42.19 |

* cited by examiner

Primary Examiner—Charles T. Jordan
Assistant Examiner—Bret Hayes
(74) Attorney, Agent, or Firm—Gordon & Jacobson, P.C.

(57) ABSTRACT

A spinnerbait lure includes a chain, flexible tubing thereover, a blade coupled to one end of the chain, and a skirted lead head hook located at or adjacent the other end of the chain. An eyelet is coupled to a central portion of the chain and extends through a hole in the tubing for attachment of fishing line. When relaxed, the spinnerbait lure assumes a substantially elongate configuration. When pulled through the water, the lure assumes a V-shaped configuration caused by the water pressure against the ends of the lure on either side of the eyelet. Then, when slack is provided to the fishing line, the lure assumes again an elongate configuration, and "helicopters" through the water, with the blade rotating to affect the lure's descent, creating a movement attractive to fish. As soon as the fishing line is pulled taut, the lure again assumes the V-shaped configuration.

24 Claims, 4 Drawing Sheets

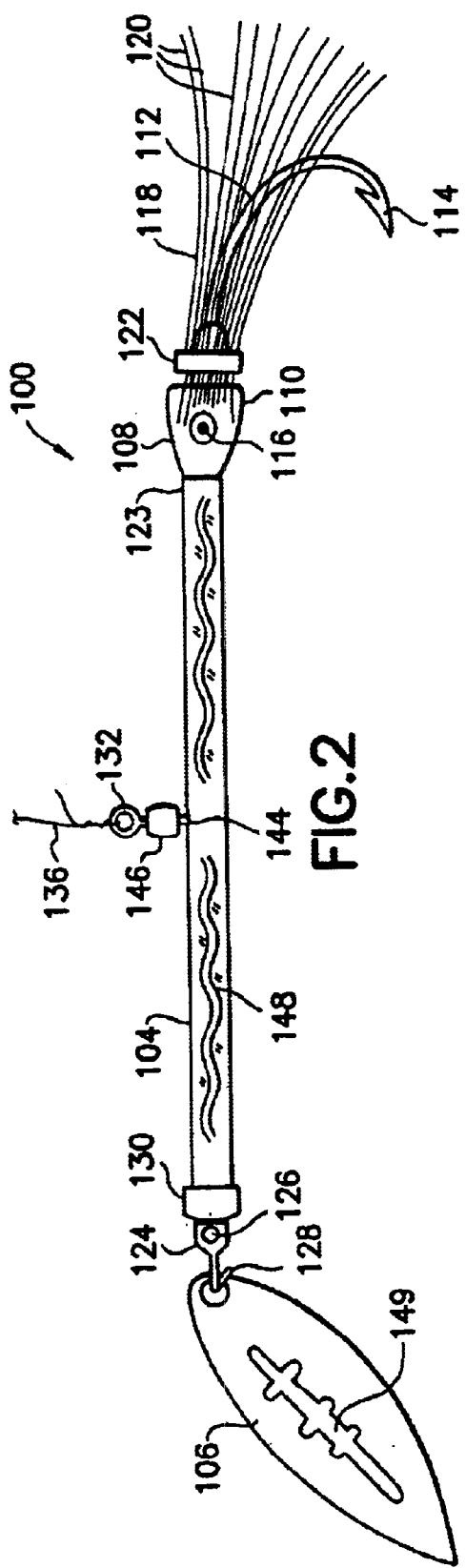
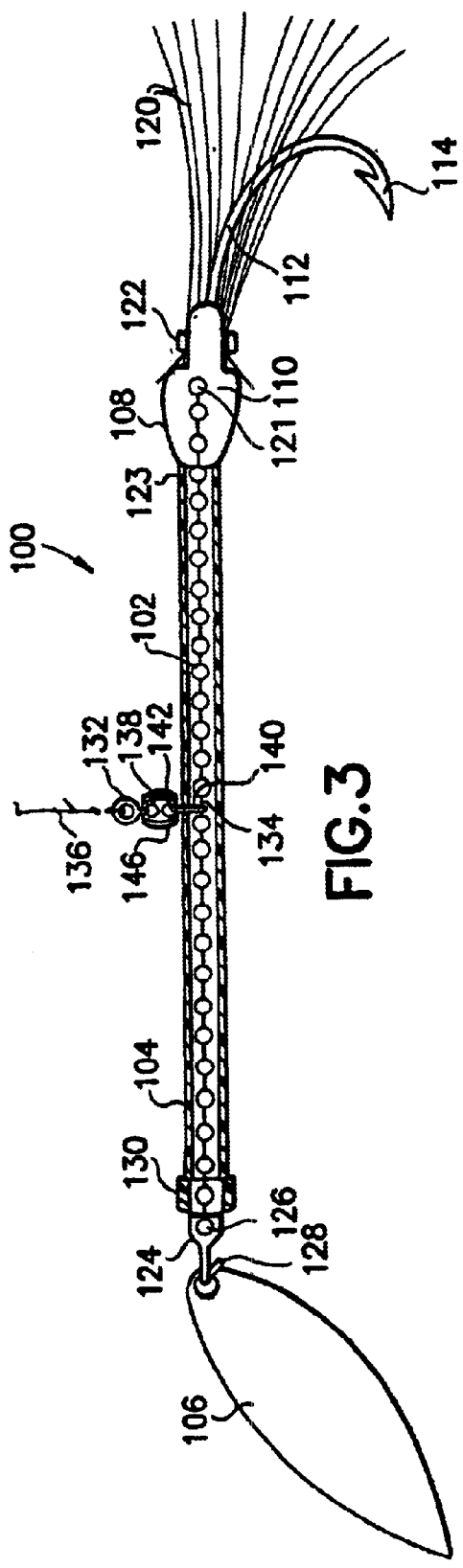

SPINNERBAIT FISHING LURE

BACKGROUND OF THE INVENTION

1. Field of the Invention

This invention relates broadly to fishing lures. More particularly, this invention relates to spinnerbait fishing lures.

2. State of the Art

Spinnerbait fishing lures are well known in the art. Referring to prior art FIG. 1, a spinnerbait lure 10 includes a V-shaped wire frame 12 having one end provided with one or more metal blades 14 rotatably mounted thereto, another end provided with a hook 18 shrouded by a filamentary skirt 20, and an eyelet 22 defined at the V-bend in the shank at which fishing line may be attached. The hook 18 typically is a "lead head" hook; i.e., the hook 18 includes a weight 24, often generally in the shape of a head, at the end of the hook shank 26 opposite the hook barb 28.

While the wire frame has a certain degree of flexibility and resiliency, whether out of the water, during casting, being pulled through the water, or in the water in a relaxed state, conventional spinnerbait lures have substantially the same V-shaped configuration. The substantially constant shape of spinnerbait lures limits their use and their success in hooking and retrieving fish. With respect to the shape, if fish are not attracted to a spinnerbait lure, there is little that can be done during fishing the lure to increase its attraction. Furthermore, when a fish is attracted and strikes the lure, it is a recognized problem with spinnerbait lures that the resilient shaft may cause a fish to bounce away from the hook and be released.

Moreover, the construction of conventional spinnerbait lures does not particularly lend itself to holding scent sprays, which are popular and desirable for attracting fish. Neither the wire frame, the blade, nor the hook is made of a material that holds such scent sprays in the water. Also, the thin wire frame construction limits the amount of color (in terms of surface area) that can be provided to the lure. Color can also be a fish attractant.

In addition, as a result of the shape of spinnerbait lures, the lures cannot be stored in the narrow elongate compartments of conventional tackle boxes.

SUMMARY OF THE INVENTION

It is therefore an object of the invention to provide a spinnerbait lure that can be moved between several configurations in the water.

It is another object of the invention to provide a spinnerbait lure that can be fished to 'swim' in novel ways in the water.

It is a further object of the invention to provide a spinnerbait lure that is better adapted to attract fish.

It is an additional object of the invention to provide a spinnerbait lure that retains fish caught on the hook.

It is also an object of the invention to provide a spinnerbait lure that is more attractive to fish, and which can hold scents in the water.

It is still another object of the invention to provide a spinnerbait lure that is easy to store in a conventional tackle box.

In accord with these objects, which will be discussed in detail below, a spinnerbait lure includes a chain, a flexible tubing over the chain, a blade coupled to one end of the chain, and a lead head hook located at or adjacent the other end of the chain. A filamentary hook skirt is attached to the lead head hook. According to one embodiment of the invention, the lead head hook is fixedly attached to one end of the tubing. According to another embodiment, the lead head hook is coupled to the chain, but movable relative to the one end of the tubing. A metal eyelet is coupled to a central portion of the chain and extends through the tubing for attachment of fishing line.

When relaxed, the spinnerbait lure assumes a substantially elongate configuration, permitting the lure to be stored in conventional tackle box compartments. When cast into the water and pulled therethrough, the lure assumes a V-shaped configuration caused by the water pressure against the ends of the lure on either side of the eyelet. Then, when slack is provided to the fishing line to which the lure is attached, the lure assumes again an elongate configuration, with the lead head generally down and the blade generally up. The lure "helicopters" through the water, with the blade rotating to affect the lure's descent and creating a movement attractive to fish. As soon as the fishing line is pulled taught, the lure again assumes the V-shaped configuration.

Moreover, the tubing is suitable for receiving and holding scents, and provides a substantially large surface area for decoration. As such, the head, hook skirt, tubing, and blade can be color coordinated in a manner most effective for catching particular species of fish.

Additional objects and advantages of the invention will become apparent to those skilled in the art upon reference to the detailed description taken in conjunction with the provided figures.

BRIEF DESCRIPTION OF THE DRAWINGS

FIG. 2 is a side elevation of a first embodiment of a spinnerbait lure according to the invention;

FIG. 3 is a longitudinal section view of the first embodiment of a spinnerbait lure according to the invention;

DETAILED DESCRIPTION OF THE PREFERRED EMBODIMENTS

Figure 1:
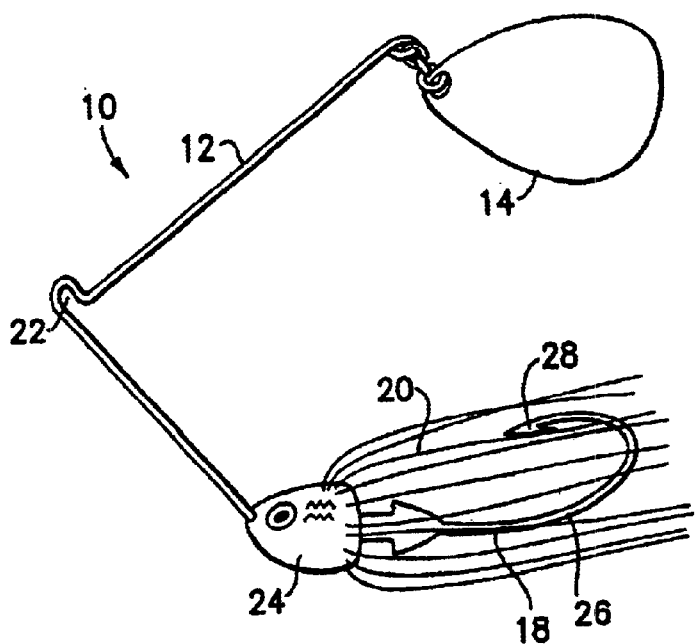
FIG. 1 is a prior art spinnerbait lure.

Turning now to FIGS. 2 and 3, a first preferred embodiment of a spinnerbait fishing lure 100 according to the invention is shown. The lure 100 includes a chain 102 extending through a flexible tubing 104. The chain 102 is preferably a stainless steel ball chain, and the tubing 104 is preferably surgical tubing made from silicone or latex. In a preferred embodiment, the tubing is approximately nine centimeters in length, and has an outer diameter of approximately six millimeters, an inner diameter of approximately four millimeters, and thus a thickness of approximately one millimeter. The chain is also approximately nine centimeters in length, but may be slightly longer than the tubing.

A preferably metal blade 106 is coupled to one end of the chain 102, and a lead head hook 108 is located at or adjacent the other end of the chain. The lead head hook 108 includes a preferably head-shaped weight portion 110 coupled to an end of the shank 112 of the hook opposite the barbed end 114. The weight portion 110 is preferably provided with fish attracting indicia, such as eyes 116. A filamentary hook skirt 118, e.g., comprised of numerous silicone filaments 120, is held, e.g., with a rubber band 122 about the weight portion 110, and operates to attract fish as well as conceal the hook.

In the preferred embodiment, the weight portion 110 of the lead head hook is preferably molded onto an end 121 of the chain 102 and also preferably fixedly attached to one end 123 of the tubing 104 to maintain the hook in an upward direction. The weight portion 110 may be, e.g., glued into the tubing such that the tubing flares at the end coupled to the weight portion 110.

The end of the chain opposite the lead head hook 108 is provided with a swivel snap 124 that is rotatably coupled to the last ball element 126 of the chain 102 on that end of the chain. A split ring 128 is coupled to the swivel snap 124, and the blade 106 is coupled to the ring 128. A metal or plastic annular bead 130 is optionally provided as a spacer between the end of the tubing 104 and the swivel snap 124.

A first metal eyelet 132 is rotatably coupled to a central portion 134 of the chain 102 for attachment of fishing line 136. The first eyelet 132 has a ball end 138. A second eyelet 140 is also provided having a ball end 142. The second metal eyelet 140 extends over the chain 102, and its ball end 142 extends through a hole 144 in a central portion of the tubing 104. The two ball ends 138, 142 are then rotatably coupled together by a collet 146. As such, the entirety of the lure 100 may rotate relative to the first eyelet 132. Alternatively, a small circular split ring (not shown) may be used as a substitute for the two eyelet assembly, with the ring extending around the chain and a portion thereof extending outside the tubing for attachment of fishing line.

Figure 4:
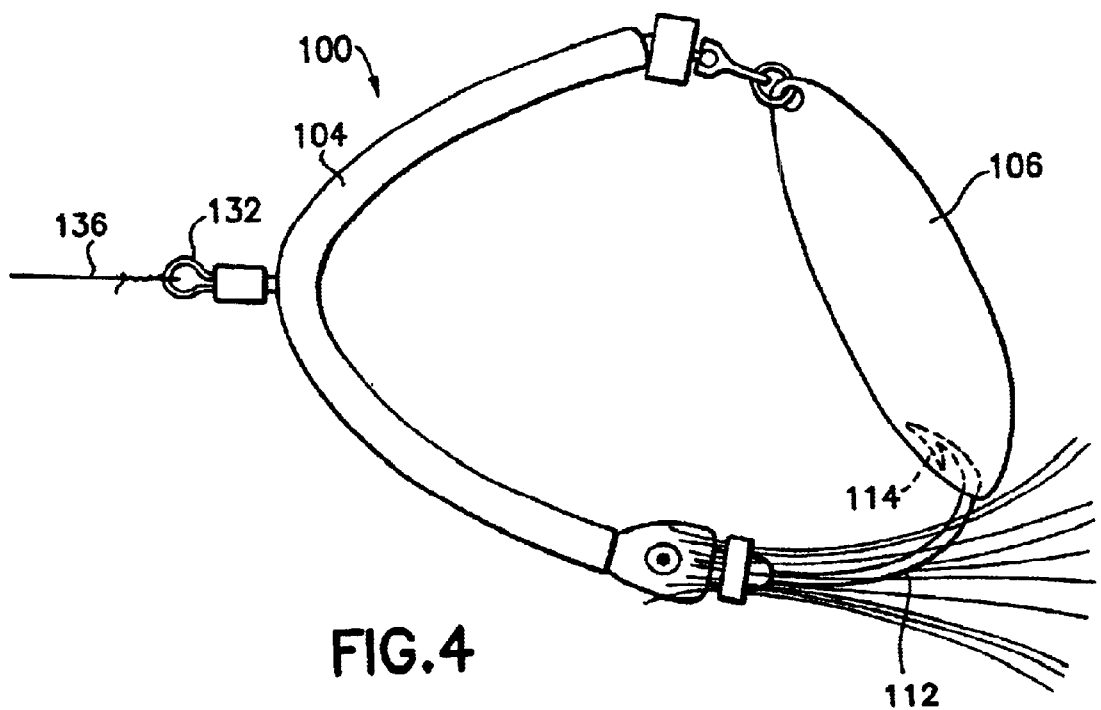
FIG. 4 is a top view of the first embodiment of a spinnerbait lure being pulled through the water.

When relaxed, i.e., when set on a flat surface, the spinnerbait lure 100 assumes a substantially elongate (nearly linear) configuration, as the tubing, while very flexible, has a memory. This permits the lure to be stored in conventional elongate tackle box compartments. Referring to FIG. 4, when tied to a line and cast into the water and pulled therethrough, the lure 100 assumes a V-shaped configuration similar to conventional spinnerbait lures. This is caused by the water pressure against the large surface area of the tubing 104 of the lure on either side of the eyelet 132. Moreover, the blade 106 preferably assumes a configuration in which it 'protects' the barbed end 114 of the hook 112 thereby permitting the lure 100 to be fished in weeded areas without snagging.

Figure 5:
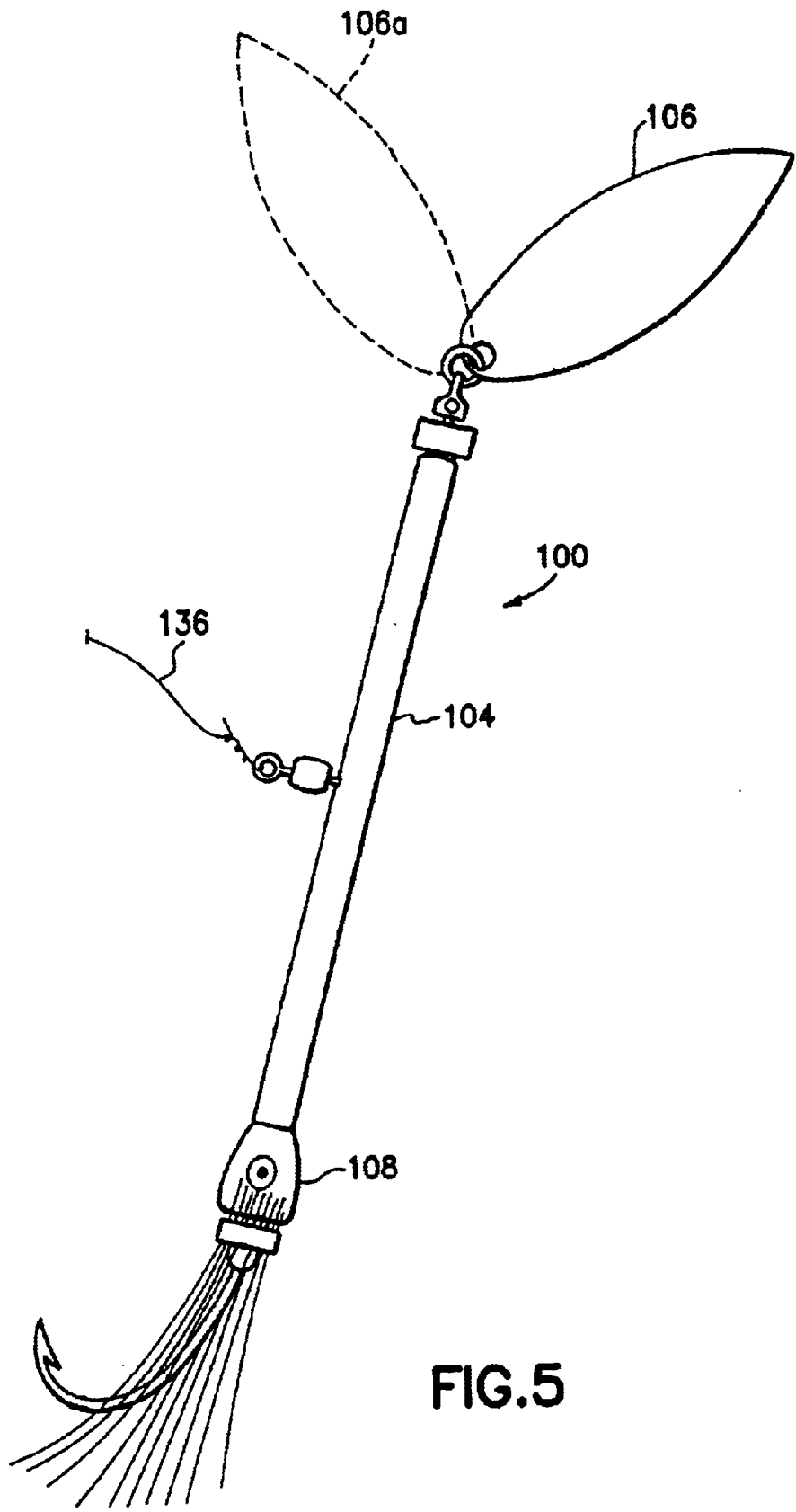
FIG. 5 is a side view of the first embodiment of a spinnerbait lure, shown in 'helicopter' motion with the blade spinning as the lure falls through water.

Then, when slack is provided to the fishing line 136, the lure again assumes an elongate configuration, with the lead head hook 108 generally down and the blade 106 generally up. Referring to FIG. 5, the lure then "helicopters" through the water, with the blade 106 rotating about a longitudinal axis of the lure (as indicated by the solid lines of 106 and phantom lines of 106a) to slow the lure's descent, creating a movement attractive to fish. The slowly descending lure appears to be "dying", which fish find attractive. This movement is not provided by or suggested by conventional spinnerbait lures. As soon as the fishing line 136 is pulled taught, the lure 100 again assumes the V-shaped configuration of FIG. 4. By pulling the lure through the water (in its V-shape), by providing line slack that causes the lure to open to a substantially linear configuration, and also by providing novel movement to the lure during descent, the lure is made very attractive to fish. The particular combination of configurations and movements can be controlled by the fisherman.

Furthermore, when a fish is hooked on the hook 108, the lure 100 holds fish better than prior art lures. This is for at least two reasons. First, when the fish pulls against the hook, a flexible connection is provided by the chain between the fishing line and the lure, providing a straighter pull against the line and more control by the fisherman. Second, the fish is unable to release itself from the hook by pushing against the hook (which can be the result with prior art resilient wire spinnerbait lures). This is because the flexible chain 102 and tubing 104 will bend under the force of the fish. Moreover, when a fish breaks water and thrashes about the chain and tubing bend without providing substantial resistance such that the hook moves with the fish, whereas the wire of a prior art lure would push against the fish, possibly causing the hook to dislodge.

Moreover, the tubing 104 is a suitable material and size for receiving and holding scent sprays. Furthermore, the tubing, as distinguished from the thin wire frame 12 (FIG. 1) of conventional spinnerbait lures, provides a substantially large surface area for decoration. As such, tubing 104, the blade 106, the lead head hook 108, and the hook skirt 118 can be color coordinated in a manner most effective for catching particular species of fish. For example, each of the elements may be the same color, or various elements may be different colors coordinated to most effectively attract fish. In addition, fish attracting indicia 148, 149 can be provided to the tubing 104 and the blade 106 in addition to, or as an alternative to, coloration.

Figure 6:
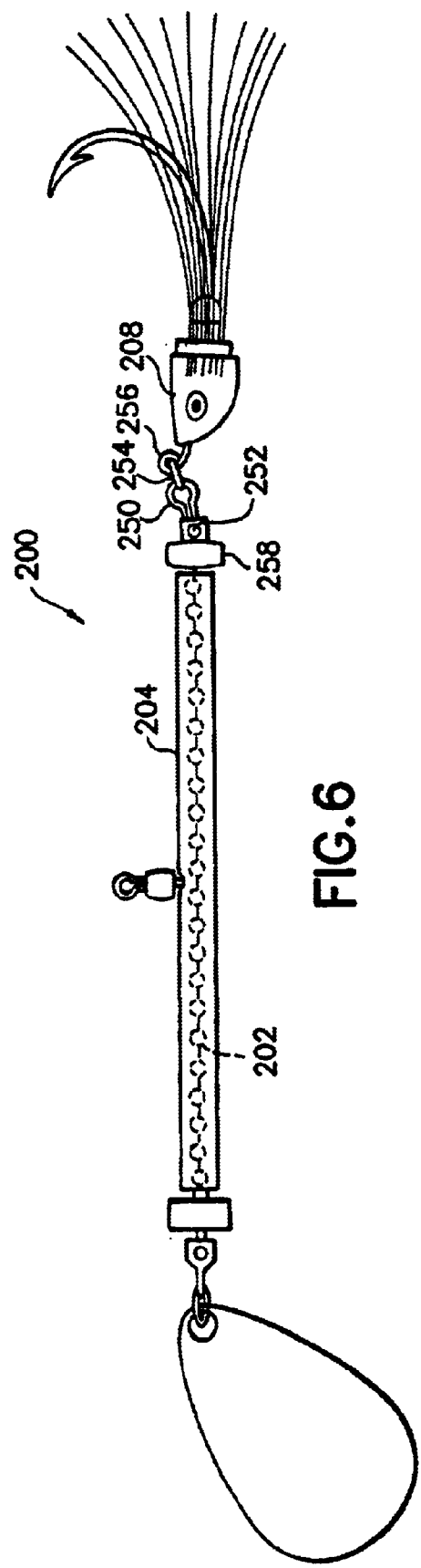
FIG. 6 is a side elevation of a second embodiment of a spinnerbait lure according to the invention.

Turning now to FIG. 6, a second embodiment of the lure 200, substantially similar to the first embodiment (with like parts having numbers incremented by 100), is shown. In the second embodiment of the lure 200, the chain 202 is longer than the tubing 204, extending through both ends of the tubing. The lead head hook 208 is coupled to the chain 202 in a manner similar to the coupling of the blade 106 to the chain 102 in the first embodiment. That is, a swivel snap 250 is rotatably coupled to the last ball element 252 of the chain 202 on the end of the chain coupled to the lead head hook. A split ring 254 is coupled to the swivel snap 250. The lead head hook is provided with an integrated ring 256 that is coupled to the split ring 254. A metal or plastic bead 258 is provided as a spacer between the end of the tubing 204 and the swivel snap 250.

There have been described and illustrated herein embodiments of a spinnerbait lure. While particular embodiments of the invention have been described, it is not intended that the invention be limited thereto, as it is intended that the invention be as broad in scope as the art will allow and that the specification be read likewise. Thus, while a ball chain is preferred, it will be appreciated that other chains, e.g., link chains, may be used as well. Furthermore, while surgical-type tubing is preferred, other tubing may be used. Also, while silicone skirt filaments are disclosed, other filament materials such as plastics, rubbers, nylon, feathers, etc can be used. Moreover, while a lead head hook is preferred, combinations of traditional hooks and weights can also be used. It will therefore be appreciated by those skilled in the art that yet other modifications could be made to the provided invention without deviating from its spirit and scope as claimed.

What is claimed is:

1. A spinnerbait fishing lure, comprising:
   a) a flexible tubing having first and second ends and a central portion therebetween, said central portion having an opening;
   b) a chain extending through said tubing and having first and second ends;
   c) a blade coupled to said first end of said chain;

d) a hook coupled to said second end of said chain;

e) a filamentary skirt at least partially surrounding said hook; and f) a means for attaching fishing line, said means extending through said opening in said central portion of said flexible tubing and coupled to a central portion of said chain.

2. A spinnerbait fishing lure according to claim 1, wherein:

said chain is a ball chain.

3. A spinnerbait fishing lure according to claim 1, wherein:

said hook is also fixedly attached to said second end of said tubing.

4. A spinnerbait fishing lure according to claim 1, wherein:

said hook is a lead head hook comprising a weighted portion, a shank portion, and a barbed portion.

5. A spinnerbait fishing lure according to claim 4, wherein:

said weighted portion is fixedly attached to said second end of said tubing.

6. A spinnerbait fishing lure according to claim 1, wherein:

said chain is a ball chain, and said first end of said chain includes an end ball element, said lure further comprises a swivel snap rotatably coupled to said end ball element, and a ring coupled to said swivel snap, wherein said blade is coupled to said ring.

7. A spinnerbait fishing lure according to claim 6, wherein:

an annular bead is provided between said first end of said tubing and said swivel snap.

8. A spinnerbait fishing lure according to claim 1, wherein:

said means for attaching fishing line includes a first eyelet element having a first ball end, a second eyelet element having a second ball end, means for rotatably coupling said first and second ball ends, said second eyelet element provided over a central portion of said chain and said first eyelet element provided external of said tubing.

9. A spinnerbait fishing lure according to claim 1, wherein;

said blade, said tubing, and said skirt are color coordinated.

10. A spinnerbait fishing lure according to claim 1, wherein:

said blade, said tubing, and said skirt are each a common color.

11. A spinnerbait fishing lure according to claim 1, wherein:

said tubing is provided with indicia.

12. A spinnerbait fishing lure according to claim 1, wherein:

said tubing is provided with a scent spray.

13. A spinnerbait fishing lure according to claim 1, wherein:

when relaxed, said lure assumes a substantially elongate configuration, and when pulled through water said lure assumes a generally V-shaped configuration.

14. A spinnerbait fishing lure according to claim 13, wherein:

when in said generally V-shaped configuration, said blade overlies said hook.

15. A spinnerbait fishing lure according to claim 1, wherein:

when in water, but not being pulled therethrough, said lure assumes an elongate configuration with said hook generally down and said blade generally up.

16. A spinnerbait fishing lure according to claim 15, wherein:

when said lure descends through said water without being pulled therethrough, said blade rotates such that the descent of said lure is slowed.

17. A spinnerbait fishing lure according to claim 16, wherein:

when during descent, said lure is pulled through the water, said lure assumes a generally V-shaped configuration.

18. A spinnerbait fishing lure according to claim 1, wherein:

said means for attaching fishing line includes a first portion coupled to said chain and at least partially within said tubing, and a second portion external of said tubing, said first and second portions being rotatable relative to each other.

19. A spinnerbait fishing lure for coupling to a fishing line, comprising:

a) a flexible tubing having first and second ends;

b) a chain extending through said tubing and having first and second ends;

c) a blade coupled to said first end of said chain;

d) a hook coupled to at least one of said second end of said chain and said second end of said tubing; and e) a means for attaching fishing line to said lure, said means extending through an opening in a central portion of said flexible tubing and coupled to a central portion of said wherein when fishing line is coupled to said means for attaching fishing line and said lure is pulled through water, said lure assumes a generally V-shaped configuration, and when slack is provided to the fishing line, said lure assumes a substantially elongate configuration.

20. A spinnerbait fishing lure according to claim 19, wherein:

when slack is provided to the fishing line such that said lure descends into said water, said blade rotates, thereby affecting the descent of said lure.

21. In a spinnerbait fishing lure having a shaft, a weighted hook at one end of the shaft, a blade at another end of the shaft, and an eyelet centrally-located with respect to the shaft for attachment of fishing line, the improvement comprising:

the shaft comprising a chain and a flexible tubing extending over a central portion of said chain, said tubing including an opening through which said eyelet is attached to said chain.

22. A spinnerbait fishing lure, comprising:

a) a flexible tubing having first and second ends;

b) a chain extending through said tubing and having first and second ends;

c) a blade coupled to said first end of said chain;

d) a hook coupled to said second end of said chain and fixedly attached to said second end of said tubing;

e) a filamentary skirt at least partially surrounding said hook; and f) an element at a central portion of said chain to which fishing line may be attached.

23. A spinnerbait fishing lure according to claim 22, wherein:

said hook is a lead head hook including a weighted portion, a shank portion, and barbed portion, and said weighted portion is fixedly attached to said second end of said tubing.

24. A spinnerbait fishing lure, comprising:

a) a flexible tubing having first and second ends;

b) a chain extending through said tubing and having first and second ends and a central portion;

c) a blade coupled to said first end of said chain;

d) a hook coupled to said second end of said chain;

e) a filamentary skirt at least partially surrounding said hook; and f) a fishing line attachment assembly including a first eyelet element having a first ball end, a second eyelet element having a second ball end, means for rotatably coupling said first and second ball ends, said second eyelet element provided over said central portion of said chain and said first eyelet element provided external of said tubing.

* * * * *